US012746882B2

(12) United States Patent
Alpat

(10) Patent No.: US 12,746,882 B2
(45) Date of Patent: Sep. 29, 2026

(54) METHOD AND DEVICE FOR CONFIGURING A PLURALITY OF CONFIGURABLE FUNCTIONS OF A VEHICLE

(71) Applicant: AUDI AG, Ingolstadt (DE)

(72) Inventor: Alper Alpat, Kösching (DE)

(73) Assignee: AUDI AG, Ingolstadt (DE)

( * ) Notice: Subject to any disclaimer, the term of this patent is extended or adjusted under 35 U.S.C. 154(b) by 129 days.

(21) Appl. No.: 18/832,284

(22) PCT Filed: Mar. 16, 2023

(86) PCT No.: PCT/EP2023/056691

§ 371 (c)(1),
(2) Date: Jul. 23, 2024

(87) PCT Pub. No.: WO2023/194062

PCT Pub. Date: Oct. 12, 2023

(65) Prior Publication Data

US 2025/0100490 A1 Mar. 27, 2025

(30) Foreign Application Priority Data

Apr. 6, 2022 (DE) ......................... 102022108254.7

(51) Int. Cl.
*B60R 16/037* (2006.01)
*B60R 25/20* (2013.01)
*G06F 3/16* (2006.01)

(52) U.S. Cl.
CPC ............ *B60R 16/037* (2013.01); *G06F 3/167* (2013.01)

(58) Field of Classification Search
CPC .... B60R 16/037; B60R 25/2081; G06F 3/167
See application file for complete search history.

(56) References Cited

U.S. PATENT DOCUMENTS

| | | | | |
|---|---|---|---|---|
| 9,147,296 | B2 * | 9/2015 | Ricci | B60R 25/102 |
| 11,221,623 | B2 * | 1/2022 | Nojoumian | B60W 40/09 |
| 11,254,351 | B2 * | 2/2022 | Ryne | B62D 6/08 |
| 11,351,941 | B1 * | 6/2022 | Maney, Jr. | B60N 2/0228 |

(Continued)

FOREIGN PATENT DOCUMENTS

| | | | |
|---|---|---|---|
| DE | 10311336 | A1 | 9/2004 |
| DE | 102010003251 | A1 | 9/2011 |

(Continued)

OTHER PUBLICATIONS

Office Action issued on Nov. 21, 2022, in corresponding German Application No. 102022108254.7, 10 pages.

(Continued)

*Primary Examiner* — Manglesh M Patel
(74) *Attorney, Agent, or Firm* — Maier & Maier, PLLC

(57) ABSTRACT

A method for configuring a plurality of configurable functions of a vehicle, including steps of generating a plurality of scenarios, each scenario defines a specific configuration of at least a subset with a plurality of the configurable functions of the vehicle; activating a respective scenario; and upon activation, a control device of the vehicle sets the respective scenario by correspondingly controlling the configurable functions of the vehicle included in the respective scenario.

11 Claims, 3 Drawing Sheets

(56) References Cited

U.S. PATENT DOCUMENTS

| | | | | |
|---|---|---|---|---|
| 2004/0158371 | A1* | 8/2004 | Iggulden | B60R 16/0231 379/102.03 |
| 2011/0307130 | A1* | 12/2011 | Gow | B62D 6/007 701/22 |
| 2015/0148989 | A1* | 5/2015 | Cooper | E05F 15/77 701/2 |
| 2015/0166076 | A1* | 6/2015 | Kim | B60W 30/182 701/36 |
| 2015/0210287 | A1* | 7/2015 | Penilla | B60N 2/0024 701/49 |
| 2017/0068245 | A1* | 3/2017 | Scofield | B60W 40/04 |
| 2017/0285641 | A1 | 10/2017 | Goldman-Shenhar et al. | |
| 2018/0059913 | A1* | 3/2018 | Penilla | B60N 2/0028 |
| 2018/0178808 | A1 | 6/2018 | Zhao et al. | |
| 2019/0196851 | A1 | 6/2019 | Penilla et al. | |
| 2025/0249756 | A1* | 8/2025 | Chidambaram | B60L 15/20 |
| 2025/0296585 | A1* | 9/2025 | Schulz | B60W 50/10 |

FOREIGN PATENT DOCUMENTS

| | | | |
|---|---|---|---|
| DE | 102013208347 | A1 | 11/2014 |
| DE | 102015202820 | A1 | 8/2016 |
| DE | 102016008875 | A1 | 2/2017 |
| DE | 102015121124 | A1 | 6/2017 |
| DE | 102017204801 | A1 | 3/2018 |
| DE | 102018206717 | A1 | 11/2019 |
| DE | 102018212298 | A1 | 1/2020 |
| DE | 102018127105 | A1 | 4/2020 |

OTHER PUBLICATIONS

International Search Report and Written Opinion on Jul. 28, 2023, in corresponding International Application No. PCT/EP2023/056691, 21 pages.

International Preliminary Report on Patentability issued on Oct. 17, 2024, in corresponding International Application No. PCT/EP2023/056691, 28 pages.

* cited by examiner

METHOD AND DEVICE FOR CONFIGURING A PLURALITY OF CONFIGURABLE FUNCTIONS OF A VEHICLE

FIELD

The present invention relates to a method for configuring a plurality of configurable functions of a vehicle. It further relates to a corresponding device for configuring a plurality of configurable functions of a vehicle, wherein the device has means for carrying out such a method. The present invention further relates to a motor vehicle with such a device.

BACKGROUND

In this context, a system for setting vehicle functions based on context-controlled usage modes is known from US 2017/0285641 A1. The usage modes are tailored to a driver's mood and/or destination-specific preferences using machine learning and can be configured by the driver.

From US 2019/0196851 A1 a system for configuring vehicle functions of a vehicle for a user is known. The user is continuously analyzed with regard to preferred settings and interactions with the vehicle functions and, by means of an automated learning process, a profile is created that can be transferred to other vehicles, wherein different interaction modes can be activated depending on the user's mood.

From DE 10 2015 121 124 A1 a method for activating a relaxation mode suitable for a driver of a motor vehicle is known. The relaxation mode is automatically implemented when the driver's mood is detected via a learned setting of personalized vehicle parameters regarding music, seating position, lighting, scent or the like and can be transferred to other motor vehicles.

SUMMARY

The object of the present invention is to provide a method as mentioned above and a device as mentioned above for configuring a plurality of configurable functions of a vehicle for the most comfortable possible use by a user.

The scenarios can be created manually by a user, but can also be derived from user behavior. When creating manually, the user can decide for themselves which configurable functions should be included in a particular scenario. During automatic creation, it can be provided that a user can subsequently make modifications to the configurable functions assigned to the scenario.

A particularly preferred embodiment is characterized in that in step a) a password is assigned to each scenario, wherein in step b) the respective scenario is activated by a voice command which contains at least the password assigned to the respective scenario, wherein step c) is carried out upon receipt of the voice command. In this way, a user can actively activate a scenario, for example in situations where a particular scenario had not previously been activated, or if he now wants to have a different scenario activated instead of a scenario that he usually chooses in a certain situation.

In an alternative embodiment, it can be provided that in step b) the respective scenario is automatically activated depending on at least one predeterminable boundary condition. Due to the automatic activation depending on predeterminable boundary conditions, scenarios can be activated without the user being aware that a certain scenario would be beneficial for him in the current situation, for example for stress management.

In this context, at least one of the following user parameters can be detected as a predeterminable boundary condition and evaluated by comparing it with a previously detected reference parameter of the user: facial expressions, gestures, tiredness, tone of speech, driving behavior, optics and haptics. It is easy to conclude from facial expressions that a driver is tense, nervous or stressed, for example through narrowed eyes, a certain mouth position and the like. This can also be concluded from gestures, for example by tapping a finger on the steering wheel or dashboard, or by hectic hand movements. Furthermore, the person's state of mind can be determined by evaluating a parameter specific to tiredness, such as the duration of an eye blink, the angle of an eye opening, and the like. The tone of the voice during speech, for example, can also indicate that the driver is stressed, as can his driving behavior. Facial expressions, gestures and tiredness are preferably detected by evaluating images recorded using interior cameras. The tone of speech, especially the volume and flow of speech, can be recorded using an interior microphone. The driving behavior can preferably be detected by measuring the steering angle and its first derivative with respect to time. In addition, the evaluation of lane departure warnings, an actuation angle of the accelerator pedal and/or the brake pedal as well as the first derivatives over time are also taken into account. In terms of optics, an optical detection of the pupils, for example using AR glasses, or the detection of a hand, for example using a Leap Motion Controller, can be evaluated. In connection with the haptics, pressure detection on the steering wheel can detect that the steering wheel is being held more tightly, as is usually the case when driving excitedly. A humidity and/or temperature sensor on the steering wheel can detect sweaty hands, which also indicates that the driver is in an agitated state of mind. The temperature sensor can rule out the possibility that the cause of sweaty hands is due to an excessive internal temperature.

Depending on this, tailor-made scenarios can be activated which, depending on the initial situation, have a calming effect on the driver or make him more alert. For example, the color of the ambient light can be changed, relaxing music or wake-up music can be played. The driver's seat can be adjusted to a more comfortable position or to an upright position, the air conditioning can spray a certain scent, the chassis can be switched to a comfort mode or a sport mode, and the like.

The generation or creation of the multitude of scenarios can be done during active creation, for example, via a connected mobile device or via a user interface of the vehicle. The scenarios can also be configured as desired in this way.

Different scenarios may include different subsets of the vehicle's plurality of configurable functions. This particularly simplifies the manual creation of scenarios, as a user can concentrate on the functions that are essential for him with regard to the respective scenario.

Preferably, the scenarios are stored in a user-specific manner and assigned to a user profile, preferably in a vehicle memory. This allows different users of a vehicle to be provided with their own scenarios.

A preferred embodiment is characterized in that the scenarios assigned to the user profile are transferred from a first vehicle to a second vehicle, wherein, if a specific scenario cannot be fully implemented in the second vehicle because a subset of the configurable functions included in the specific scenario is not available in the second vehicle, it is checked whether this subset can be activated and/or loaded upon request. These are in particular functions that can be activated and/or loaded via software, i.e. the hardware is already present in the vehicle, but the operation of the hardware can be modified depending on the activation or loading of certain software. For example, certain features of the hardware can be subsequently unlocked or loaded by paying a designated amount. For example, a specific relaxing music can be loaded and played through the vehicle's music system. Furthermore, the spectrum of colors that can be emitted by an ambient light can be expanded, and the like.

In this context, if the check is positive, a corresponding function-specific indication may be displayed on a display device for approval or rejection by the user. In this way, the user can decide whether or not to take the actions required to fully implement a particular scenario.

If approval is granted, the corresponding function is activated or loaded in the vehicle, wherein the activated or loaded function is configured via a user interface of the vehicle and then saved for the corresponding scenario in the user profile. In this context, the user interface can provide input to configure the corresponding function.

When generating or creating a scenario, in particular in the manual creation variant, it is particularly advantageous if, within a scenario, the configuration of at least a first function is coupled with the configuration of at least a second function, so that when the configuration of the first function is modified, the configuration of the second function is automatically modified in a predeterminable manner. For example, if the user selects relaxing music as the background music, the ambient lighting is automatically set to green. Green lighting is recognized to help a person relax. Conversely, if aggressive music is chosen, for example to prevent a driver from falling asleep on long, monotonous journeys and when the driver is late, the ambient lighting can be set to red at the same time. The setting of other functions can be combined in a similar way. This makes it particularly easy to create scenarios for a user, especially if, for example, he or she is not aware of the effects of different colors of ambient lighting on his or her mood.

It has further proven advantageous that at least one environmental parameter is determined, wherein the configuration of at least one function of an activated scenario is modified depending on the at least one environmental parameter. For example, when it's raining, the air conditioning may give off a different scent than when it's sunny. As is well known, nature smells different when it is raining or shining, spring or summer, so this effect can be captured and used to intensify an activated scenario. For example, the interval of a windshield wiper, an accelerator pedal characteristic, the response of a steering can be modified depending on environmental conditions in order to support a basic tenor of an activated scenario. For example, in the case of rain and an activated "relax" or "relaxation mode" scenario, the accelerator pedal characteristic may be flattened or a steering can become less direct, so that this setting of functions, depending on the environmental conditions detected, will support, in particular intensify, an activated scenario in terms of its effect on the user.

Further advantageous embodiments result from the dependent claims.

The invention also includes developments of the device according to the invention, which have features as have already been described in conjunction with the developments of the method according to the invention. This applies accordingly with regard to further developments of the motor vehicle according to the invention. For this reason, the corresponding developments are not described once again here.

The motor vehicle according to the invention is preferably designed as an automobile, in particular as a passenger car or truck, or as a passenger bus or motorcycle.

The invention also comprises the combinations of the features of the described embodiments. The invention therefore also comprises implementations which each have a combination of the features of several of the described embodiments, unless the embodiments have been described as mutually exclusive.

BRIEF DESCRIPTION OF THE FIGURES

Exemplary embodiments of the invention are described hereinafter. In particular.

DETAILED DESCRIPTION

Figure 1:
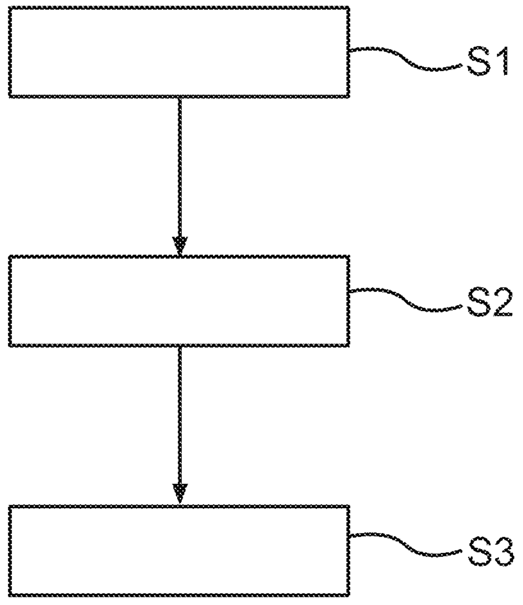
FIG. 1 shows a signal flow chart for an exemplary embodiment of a method according to the invention.

The exemplary embodiments explained below are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

FIG. 1 shows a schematic representation of a signal flow chart for an exemplary embodiment of a method according to the invention for configuring a plurality of configurable functions of a vehicle.

In step S1, a plurality of scenarios are generated, wherein each scenario defines a specific configuration of at least a subset with several of the configurable functions of the vehicle. Configurable functions of the vehicle can be in particular the ambient lighting in terms of light intensity and color, a music playback device in terms of volume and type of music played, the accelerator pedal in terms of the accelerator pedal characteristic curve, a brake pedal in terms of the brake pedal characteristic curve, air conditioning in terms of ventilation strength, temperature and spray fragrance emitted, vehicle dynamics program, in particular comfort mode or sport mode, seat position, windshield wiper system in terms of the set interval, steering in terms of directness, displays in terms of videos shown in the case of at least partially autonomous driving, seat, wherein for example music impulses, in particular the bass of a piece of music, are transmitted to the user in a pleasant, tactile manner via a massage function, windows, wherein shading, in particular so-called cocooning, can be carried out.

In step S2, a respective scenario is activated. This can be done, for example, by assigning a password to each scenario in step S1, wherein in step S2 the respective scenario is activated by a voice command which contains at least the password assigned to the respective scenario. Alternatively, in step S2 the respective scenario can be activated automatically depending on at least one predeterminable boundary condition. At least one of the following user parameters can be detected as a predeterminable boundary condition and evaluated by comparing it with a previously detected reference parameter of the user: facial expressions, gestures, tiredness, tone of speech, driving behavior, optics and haptics.

Finally, in step S3, upon activation a control device of the vehicle sets the respective scenario by correspondingly controlling the configurable functions of the vehicle included in the respective scenario.

Figure 2:
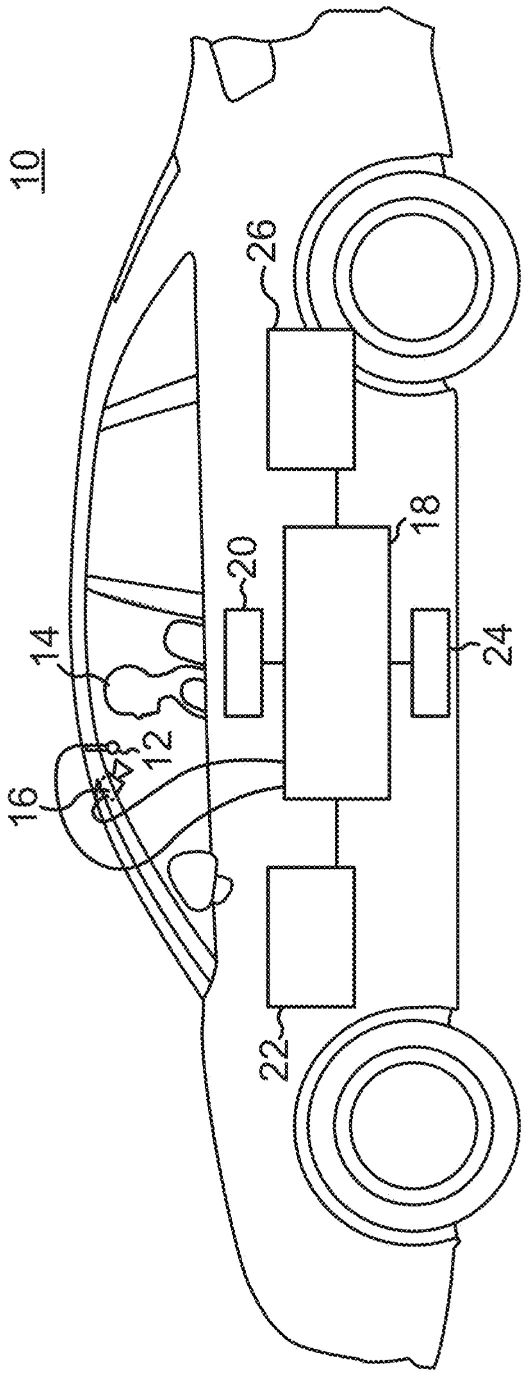
FIG. 2 shows a schematic representation of a motor vehicle according to the invention in which an embodiment of the method according to the invention is implemented.

FIG. 2 shows a schematic representation of a motor vehicle 10 according to the invention in which the method according to the invention is implemented. The motor vehicle 10 comprises a microphone 12 for recording verbal utterances of a user 14 and comparing them in terms of tone of voice against a previously recorded reference tone of voice of the user, which was recorded when the user was in a balanced state of mind, i.e. a normal state. In a corresponding manner, the vehicle comprises a camera 16 to detect the parameters of facial expressions, gestures and fatigue of the user 14 in order to also compare these with corresponding reference parameters of the user 14, which were recorded or detected when the driver was in a balanced state of mind.

The control device is designated 18 and is designed, as mentioned, to control at least a subset of configurable functions of the vehicle 10 depending on an activated scenario. Examples of configurable functions of the vehicle 10 include a music system 20, an air conditioning system 22, an ambient light 24 and an accelerator pedal 26.

Figure 3:
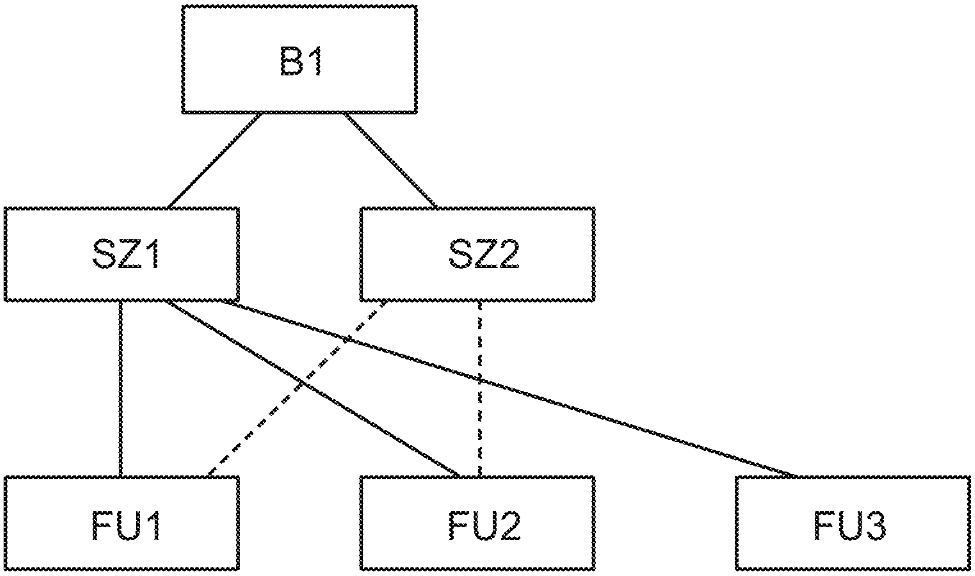
FIG. 3 shows a schematic representation for clarification of an embodiment of the method according to the invention.

FIG. 3 shows exemplary scenarios SZ1 and SZ2, which are stored for a user profile B1. While in scenario SZ1 the configurable functions FU1, FU2 and FU3 are configured, scenario SZ2 only comprises a configuration of functions FU1 and FU2.

The invention claimed is:

1. A method for configuring a plurality of configurable functions of a vehicle, the method comprising:

a) generating a plurality of scenarios, wherein each scenario defines a specific configuration of at least a subset of the plurality of the configurable functions of the vehicle, wherein generating the plurality of scenarios comprises receiving, via a user interface of the vehicle or a connected mobile device, user input that selects, from among the plurality of the configurable functions of the vehicle, the subset of configurable functions to be included in that scenario;

b) activating a respective scenario of the plurality of scenarios; and c) upon activation of the respective scenario, a control device of the vehicle sets the respective scenario by controlling the configurable functions of the vehicle for which the respective scenario defines the specific configuration, wherein in step a) a password is assigned to each scenario, wherein in step b) the respective scenario is activated by a voice command which contains at least the password assigned to the respective scenario, wherein step c) is carried out upon receipt of the voice command.

2. The method according to claim 1, wherein different scenarios comprise different subsets of the plurality of configurable functions of the vehicle.

3. The method according to claim 2, wherein the scenarios are saved as assigned to a user profile on a user-specific basis.

4. The method according to claim 1, wherein the scenarios are saved as assigned to a user profile on a user-specific basis.

5. The method according to claim 4, wherein the scenarios assigned to the user profile are transferred from a first vehicle to a second vehicle, wherein, if a specific scenario cannot be fully implemented in the second vehicle because a subset of the configurable functions included in the specific scenario is not present in the second vehicle, it is checked whether this subset can be activated and/or loaded upon request.

6. The method according to claim 5, wherein if the check is positive, a corresponding function-specific indication is displayed on a display device for approval or rejection by the user.

7. The method according to claim 6, wherein if approval is granted, the corresponding function is activated or loaded in the vehicle, wherein the activated or loaded function is configured via a user interface of the vehicle and then saved for the corresponding scenario in the user profile.

8. The method according to claim 1, wherein within a scenario the configuration of at least one first function is coupled with the configuration of at least one second function, so that when the configuration of the first function is modified, the configuration of the second function is automatically modified in a predeterminable manner.

9. The method according to claim 1, wherein at least one environmental parameter is determined, wherein the configuration of at least one function of an activated scenario is modified depending on the at least one environmental parameter.

10. A device for configuring a plurality of configurable functions of a vehicle, the device comprising a control device, the device being configured to: (i) generate a plurality of scenarios, wherein each scenario defines a specific configuration of at least a subset of the plurality of the configurable functions of the vehicle, wherein generating the plurality of scenarios comprises receiving, via a user interface of the vehicle or a connected mobile device, user input that selects, from among the plurality of the configurable functions of the vehicle, the subset of configurable functions to be included in that scenario; and (ii) activate a respective scenario of the plurality of scenarios; wherein, upon activation of the respective scenario, the control device sets the respective scenario by controlling the configurable functions of the vehicle for which the respective scenario defines the specific configuration, wherein the device is configured to assign a password to each scenario when generating the plurality of scenarios, wherein the device is configured to activate the respective scenario by a voice command which contains at least the password assigned to the respective scenario, and wherein the control device is configured to set the respective scenario upon receipt of the voice command.

11. A motor vehicle comprising the device of claim 10.

* * * * *